UNITED STATES PATENT OFFICE 2,625,565

PREPARATION OF THIO-ALKYL PANTOTHENAMIDES

Esmond E. Snell, Madison, Wis., and Eugene L. Wittle and James A. Moore, Detroit, Mich., assignors to Parke, Davis & Company, Detroit, Mich., a corporation of Michigan No Drawing. Application March 28, 1951, Serial No. 218,096

7 Claims. (Cl. 260—561)

This invention relates to methods for obtaining organic sulfur compounds. More particularly, the invention relates to methods for obtaining organic sulfides having the formulas,

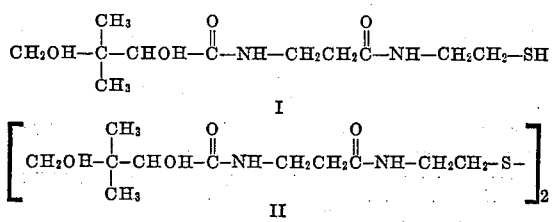

In accordance with the present invention, the organic sulfides can be prepared by reaction of an ester of pantothenic acid with hydrazine forming pantothenyl hydrazide. The latter is then allowed to react with nitrous acid to form the corresponding pantothenyl azide. The azide is treated with β-mercaptoethylamine or with bis(β-aminoethyl) disulfide to obtain the sulfides I and II, respectively.

The above reactions are illustrated by the following:

where R is an alkyl, a lower phenalkyl or phenyl radical.

In carrying out the preparation of the hydrazide, hydrazine, which can be furnished to the reaction mixture in the form of hydrazine hydrate, hydrazine sulfate, or anhydrous hydrazine, is allowed to react with an ester of pantothenic acid in the absence of or the presence of a solvent such as water, a lower aliphatic alcohol, or a mixture of same, or an excess of hydrazine itself. The reaction temperature is maintained at about 0° C. to 100° C.

In the formation of the azide of pantothenic acid, the pantothenic acid hydrazide is allowed to react with nitrous acid in the presence of water, lower aliphatic alcohols, mixtures of water and water-immiscible lower aliphatic alcohols, such as butanol, and mixtures of water and lower molecular weight fatty acid esters such as ethyl acetate and the like. In the case of two-phase systems such as the latter, the azide product occurs in the organic solvent phase for the most part. The nitrous acid may be generated from an inorganic nitrite and a strong acid or it can be generated from the reaction of an organic

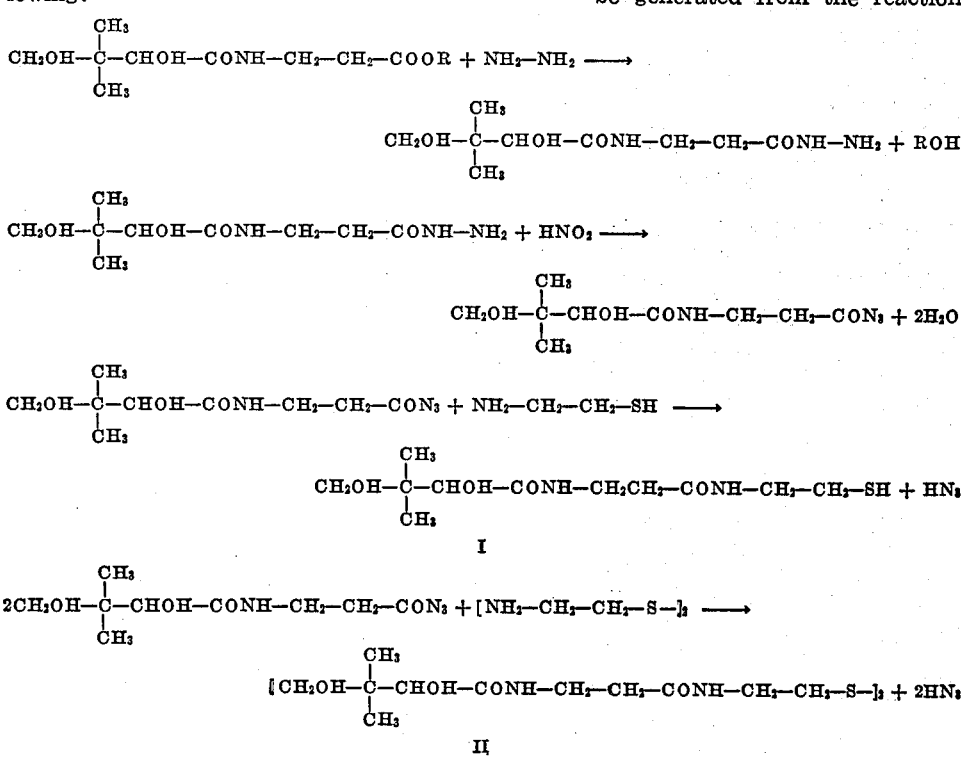

nitrite such as the alkyl nitrites, e. g. butyl nitrite, and an inorganic or organic acid. During the reaction of the hydrazide with the nitrous acid, the temperature is maintained below about 15° C. and an excess of dilute or concentrated acid is desirable.

The pantothenic acid azide, when formed in the aqueous or aqueous and water-miscible organic solvent mixture, is preferably used directly in the solution for the next step. When the two-phase system is employed, it is preferable to use the organic layer containing the azide in the next step.

The reaction of the pantothenic acid azide and β-mercaptoethylamine or bis(β-aminoethyl) disulfide can be carried out under a variety of conditions. When the azide is formed in the single phase such as the water or water-alcohol solution, the reaction is carried out by adding the appropriate sulfur compound and then adjusting the pH of the solution to between about 8 to 13 by addition of a basic solution such as an aqueous alkali metal hydroxide or carbonate or, alternatively, an excess of the amine reactant. When the azide is collected in the organic phase of the two-phase system described above, the reaction with the appropriate sulfur compound is carried out by merely adding an excess of the latter. The reaction temperatures in either case may range from 0° to 60° C., but preferably from about 20° to 40° C.

While no mention was made of the stereoisomeric form of the pantothenic acid esters used in the above reactions, it is to be understood that the scope of the present invention clearly includes both the esters of the dextrorotatory biologically active d-pantothenic acid, as well as those of the optically inactive dl-pantothenic acid in which latter case the optically inactive sulfide compounds are obtained as products.

The invention is illustrated by the following examples:

Example 1

To 11 g. of hydrazine hydrate (85%) cooled in an ice bath is added 11.5 g. of methyl d-pantothenate and the cold mixture is stirred vigorously. After the reaction takes place and the mixture is warmed to 30 C., it is allowed to stand at room temperature for two days and then evaporated to dryness in vacuo at 50° C. The residue (14.7 g.) of pantothenyl hydrazide is a clear glassy oil.

To 7.3 g. of this crude hydrazide dissolved in 21 cc. of warm water is added 4 cc. of glacial acetic acid. The solution is placed in a beaker and cooled in an ice bath and, with stirring, a solution of 1.7 g. of sodium nitrite in 5 cc. of water is added dropwise. One cc. more of acetic acid is added to maintain the pH at 5 and the solution is allowed to stir in the cold for one hour. To the solution is added sufficient strong sodium hydroxide solution to adjust the pH to 8 and 2 g. of β-mercaptoethylamine is added. The pH is adjusted to 9 with additional sodium hydroxide and the solution is stirred in the cold for one hour and then at room temperature for one hour. The pH of the solution is then adjusted to 7 with dilute acid and the resulting neutral solution is concentrated in vacuo to a clear, colorless viscous oil containing N-[(+)-pantothenyl]-β-aminoethanethiol in a crude state.

The crude N-[(+)-pantothenyl]-β-aminoethanethiol so obtained is purified by dissolving the crude reaction product in 45 cc. of anhydrous n-butanol and pouring the resulting solution through a chromatograph column containing 272 g. of activated carbon. The column is washed with n-butanol and fractions are collected from time to time and the fractions containing solids assaying about 25 to 40% pure N-[(+)-pantothenyl]-β-aminoethanethiol against *Lactobacillus helveticus* 80 poured onto a chromatograph column containing 136 g. of an alkaline earth aluminum silicate known commercially as Superfiltrol. The column is washed thoroughly with anhydrous n-butanol and the washings and main solution discarded. n-Butanol saturated with water is poured through the column to elute the N-[(+)-pantothenyl]-β-aminoethanethiol and the resulting solution evaporated to dryness in vacuo at low temperature to obtain the desired product in pure form. Its formula is,

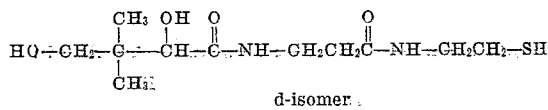

d-isomer

Instead of pouring the anhydrous n-butanol solution onto the alkaline earth aluminum silicate chromatograph column, one can simply repeat the treatment with a carbon chromatograph column to obtain the pure product. In some instances, the first carbon treatment produces fractions containing pure N-[(+)-pantothenyl]-β-aminoethanethiol and in those cases it is, of course, not necessary to treat the fraction with alkaline earth aluminum silicate nor again with activated carbon.

While the thiol compound described above is the chief product formed in the above reaction and purification, there may be a certain amount of the corresponding disulfide occurring in the final product due to oxidation of the thiol taking place during the purification steps.

Example 2

To a solution of 4.8 g. of methyl d-pantothenate in 10 cc. of methanol is added 2.3 cc. of hydrazine hydrate (85%). The solution is allowed to stand at 25° C. for twenty hours and then evaporated to dryness in vacuo at 50° to leave a clear glassy oil. This is dissolved in methanol and re-evaporated several times to remove excess hydrazine. The d-pantothenyl hydrazide is dissolved in 25 cc. of water in a beaker and cooled in an ice bath and with stirring is acidified to pH 3.5 with 6 N hydrochloric acid. A solution of 1.4 g. of sodium nitrite in 7.5 cc. of water is added slowly, keeping the pH at 3.5 with more acid. The solution is allowed to stir in the cold for one hour and then made basic to pH 8 with 2 N sodium hydroxide solution. A solution of 1.6 g. of β-mercaptoethylamine in 10 cc. of water is added and after stirring in the cold for twenty minutes the solution is allowed to stand at 25° C. overnight. The solution was acidified from pH 8.5 to 7.3 and concentrated in vacuo to a clear colorless viscous oil. The pure product can be isolated from this oil by the method described in Example 1.

Example 3

To 7.3 g. of crude d-pantothenyl hydrazide dissolved in 21 cc. of water and stirred in a beaker cooled on an ice bath is added sufficient 6 N hydrochloric acid to shift the pH to 4. Then a solution of 1.7 g. of sodium nitrite in 5 cc. of water is added dropwise over a period of one hour, keeping the pH at 4 by additions of 6 N hydrochloric acid. After stirring for one-half hour, 2.8 g. of bis(β-aminoethyl) disulfide dihydrochloride is added. The pH is then adjusted to 8.5 with 50% aqueous sodium hydroxide solution and the solution allowed to stir for one and one-half hours. It is then acidified to pH 7.5 and concentrated in vacuo to a clear colorless viscous oil. The pure product can be isolated from this oil by the method described in Example 1. The formula of this product is,

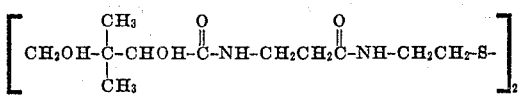

Example 4

To a solution of 10 g. of methyl-d-pantothenate in 10 cc. of methanol is added a solution of 11 g. of 85% hydrazine hydrate in 10 cc. of methanol. The solution is allowed to stand at 25° C. for sixteen hours and then gently refluxed for one hour. It is evaporated to dryness in vacuo at 50° C., redissolved in methanol and evaporated several times to yield 13.4 g. of d-pantothenyl hydrazide as a clear, glassy oil.

3 g. of this crude hydrazide is dissolved in 25 cc. of absolute ethanol and 15 cc. of 1.5 N hydrochloric acid in ethanol is added. Some white, solid hydrazine monohydrochloride precipitates and is filtered off and discarded. The clear filtrate is acidified with 5 cc. more 1.5 N hydrochloric acid and then cooled in an ice bath. To the cold solution is added slowly and with stirring 1.5 cc. of n-butyl nitrite. The solution is kept cold for forty-five minutes and then 1.5 g. of β-mercaptoethylamine is added and the solution made alkaline with 2 N sodium hydroxide solution to pH 10. The solution is allowed to stand at 25° C. for sixteen hours and then 15 cc. of water is added to dissolve all insoluble solids and give a clear solution having a pH of 9.5. After one hour 6 N hydrochloric acid is added to pH 7 and concentrated in vacuo to a clear colorless viscous oil containing 36,210,000 LBF units corresponding to a yield of 75% of theory of the desired product. The pure product can be isolated from this oil by the method described in Example 1.

Example 5

To 2.5 g. of crude d-pantothenyl hydrazide in 11 c. of absolute ethanol is added 15 cc. of 1.5 N hydrochloric acid in absolute ethanol. The white insoluble precipitate is filtered off, the clear filtrate cooled in an ice bath, and 1 cc. of n-butyl nitrite added with stirring. After stirring for two hours in the ice bath, the solution of 1 g. of β-mercaptoethylamine in 5 cc. of water is added and then 5 cc. more water added to form a clear solution. The pH of the solution is adjusted to 9 with dilute sodium hydroxide and allowed to stand sixteen hours at 25° C. Dilute acid is added to pH 7 and the solution concentrated in vacuo to a clear colorless viscous oil containing 14,400,000 LBF units corresponding to a yield of 36% of theory of the desired product. The pure product can be isolated from this oil by the method described in Example 1.

Example 6

To a solution of 2.5 g. of crude d-pantothenyl hydrazide in 11 cc. of ethanol is added 30 cc. of water and 40 cc. of n-butyl alcohol and the mixture is placed in a beaker and cooled in an ice bath. With stirring the solution is acidified with 6 N hydrochloric acid to pH 4 and then a solution of 700 mg. of sodium nitrite in 5 cc. of water is added. The pH is kept at 3.8–4 with acid and the solution stirred in the cold for forty-five minutes. The cold butanol layer is then separated and to it is added 1 g. of β-mercaptoethylamine. The pink color which forms soon fades and the colorless solution is allowed to stand at 25° C. for sixteen hours. Microbiological assay showed 17,000,000 units of LBF activity, or a yield of 41% of theory of the desired product. The pure product may be isolated from this solution as in the previous examples.

Example 7

To a solution of 2.5 g. of crude d-pantothenyl hydrazide in 11 cc. of ethanol is added 6 cc. of 3 N alcoholic hydrochloric acid and the solution filtered from the insoluble hydrazine mono-hydrochloride which forms. The clear filtrate is mixed with 30 cc. of water and 40 cc. of butanol and cooled in an ice bath. The pH of the solution is 2.8. With stirring a solution of 700 mg. of sodium nitrite in 10 cc. of water is added slowly and the pH kept at 3 by the addition of dilute acid. The solution is stirred for one hour in the ice bath and the butanol layer separated. A second solution is prepared as follows: 230 mg. of metallic sodium is dissolved in 10 cc. of methanol and to it is added a solution of 1.12 g. of bis(β-aminoethyl)disulfide dihydrochloride in 10 cc. of methanol. The butanol layer above is washed once with 20 cc. of cold water and then added to the bis(β-aminoethyl) disulfide solution. After standing for sixteen hours at 25° C., the solution is concentrated in vacuo to a clear colorless viscous oil containing 12,500,000 LBF units of activity which corresponds to 30% of the theoretical yield of the desired product. The pure product can be isolated from this oil by the method described in Example 1.

Example 8

To a solution of 78.5 g. of ethyl-d-pantothenate in 100 cc. of methanol is added a solution of 78.5 g. of 85% hydrazine hydrate in 50 cc. of methanol. The solution becomes warm due to reaction and is then allowed to stand at 25° C. for sixteen hours. The solution is evaporated in vacuo at 0.5 mm. pressure and 50° C. to leave 108.5 g. of clear, colorless oil, the hydrazide of d-pantothenic acid still containing some hydrazine.

The hydrazide is dissolved in 200 cc. of absolute ethanol, cooled in an ice bath and to it is added 250 cc. of 3.3 N ethanolic hydrochloric acid, sufficient to make the solution test acidic. The white solid hydrazine monohydrochloride is filtered off and washed with a little ethanol. The clear filtrate is added to a mixture of 1200 cc. of water and 1600 cc. of n-butanol and the whole mixture stirred and cooled in an ice bath to 5–10° C. A solution of 22 g. of sodium nitrite in 50 cc. of water is added dropwise over a period of forty-five minutes at 8° C. 30 cc. of 6N hydrochloric acid is also added slowly to maintain the pH of the solution at 3.5–4. The solution is allowed to stir at 5° C. for two hours. The butanol layer is then separated from the water layer and washed once with 200 cc. of ice water.

To it is then added a solution of 40 g. of β-mercaptoethylamine in 100 cc. of methanol. The light red color which forms fades after one hour. The aqueous layer above is extracted once with 500 cc. of butanol and the butanol washed with 100 cc. of ice water and added to the main butanol reaction mixture. This solution is allowed to stand at 25° C. for sixteen hours and then concentrated in vacuo at 40° C. to 1180 cc. of butanol solution. Microbiological assay shows 624,574,000 units of LBF activity which is 39% of the theoretical yield of the desired product.

The product in the butanol solution may be purified by passing it over an activated charcoal column containing 40 g. of activated charcoal for each gram of crude product (obtained by drying and weighing a portion of the butanol solution) or by passing it over a column containing 50 g. of alkaline earth aluminum silicate per gram of crude product, as in Example 1.

What we claim is:

1. Process for obtaining a member of the class consisting of a compound of the formula,

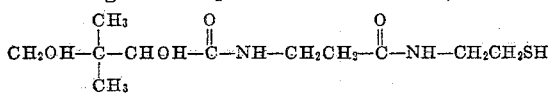

and a compound of the formula,

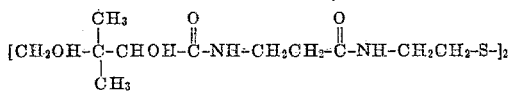

which comprises reacting an ester of pantothenic acid with hydrazine to obtain the hydrazide of pantothenic acid, reacting said hydrazide with nitrous acid to obtain the azide of pantothenic acid, and thereafter reacting said azide with a member of the class consisting of β-mercaptoethylamine and bis(β-aminoethyl) disulfide.

2. Process for obtaining a member of the class consisting of a compound of the formula,

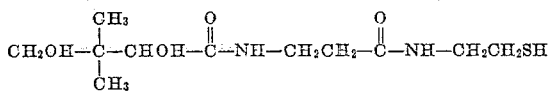

and a compound of the formula,

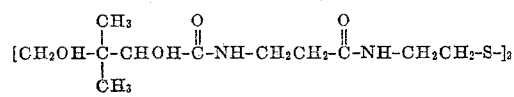

which comprises reacting at a temperature between 0° and 60° C. the azide of pantothenic acid with a member of the class consisting of β-mercaptoethylamine and bis(β-aminoethyl) disulfide.

3. Process for obtaining a compound of the formula,

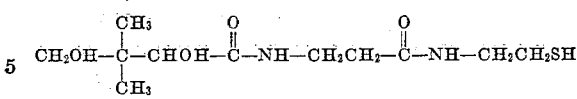

which comprises reacting the ethyl ester of d-(+)-pantothenic acid with hydrazine to obtain the hydrazide of pantothenic acid, reacting said hydrazide with nitrous acid to obtain the azide of pantothenic acid, and thereafter reacting said azide with β-mercaptoethylamine.

4. Process which comprises reacting at a temperature between 0° and 60° C. the azide of pantothenic acid with a member of the class consisting of β-mercaptoethylamine and bis(β-aminoethyl)-disulfide.

5. Process which comprises reacting at a temperature between 0° and 60° C. the azide of d-(+)-pantothenic acid with a member of the class consisting of β-mercaptoethylamine and bis(β-aminoethyl) disulfide.

6. Process which comprises reacting at a temperature between 0° and 60° C. the azide of d-(+)-pantothenic acid with β-mercaptoethylamine.

7. Process which comprises reacting at a temperature between 0° and 60° C. the azide of d-(+)-pantothenic acid with bis(β-aminoethyl)-disulfide.

ESMOND E. SNELL.
EUGENE L. WITTLE.
JAMES A. MOORE.

REFERENCES CITED

The following references are of record in the file of this patent:

UNITED STATES PATENTS

| Number | Name | Date |
|---|---|---|
| 2,340,757 | Kaase et al. | Feb. 1, 1944 |
| 2,485,116 | Savard | Oct. 18, 1949 |